Feb. 2, 1937.   C. W. GORDON ET AL   2,069,524
DIE FOR CONNECTING PIPES
Original Filed Aug. 8, 1932   3 Sheets-Sheet 1
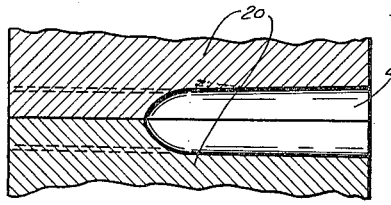
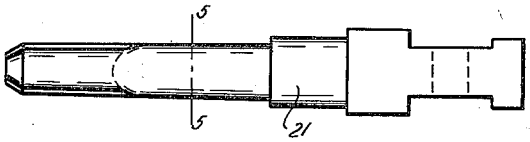
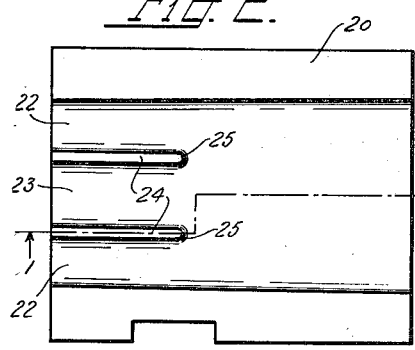
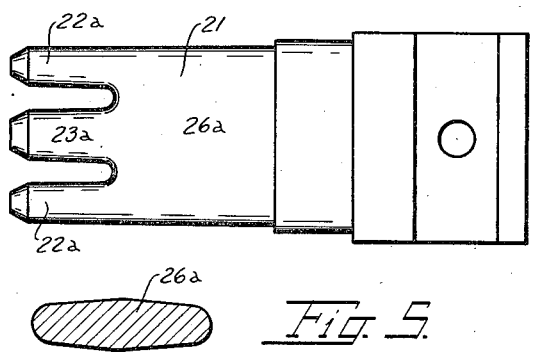
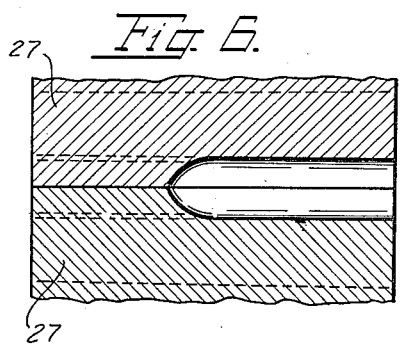
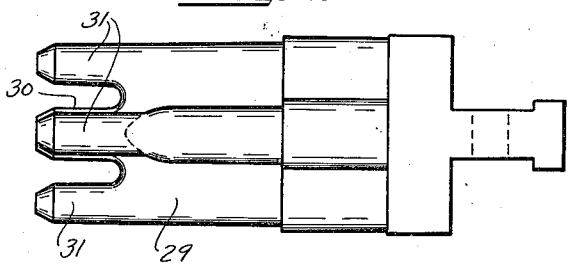
INVENTORS
CHARLES W. GORDON.
THOMAS F. BIRMINGHAM.
BY
ATTORNEY Feb. 2, 1937.        C. W. GORDON ET AL        2,069,524
DIE FOR CONNECTING PIPES
Original Filed Aug. 8, 1932    3 Sheets-Sheet 2

INVENTORS
CHARLES W. GORDON.
BY THOMAS F. BIRMINGHAM.
ATTORNEY

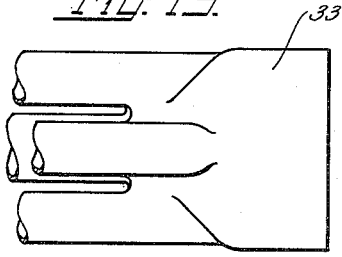
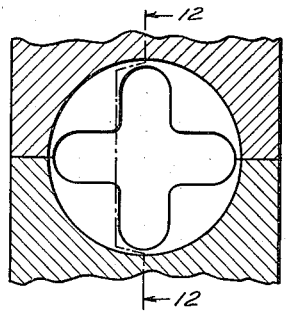
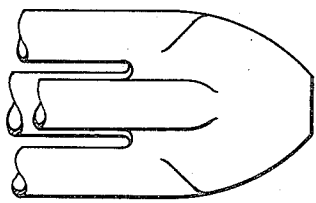
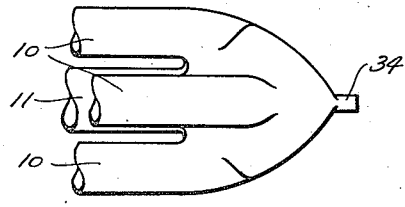
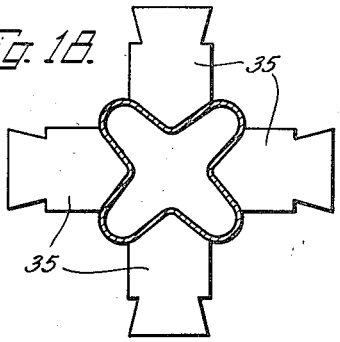
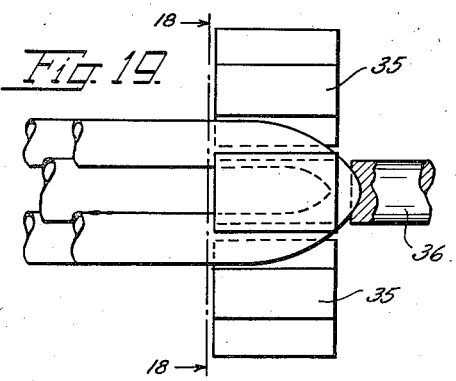

Patented Feb. 2, 1937

2,069,524

UNITED STATES PATENT OFFICE 2,069,524

DIE FOR CONNECTING PIPES

Charles W. Gordon and Thomas F. Birmingham, Hammond, Ind., assignors to The Superheater Company, New York, N. Y.

Original application August 8, 1932, Serial No. 627,874. Divided and this application January 6, 1934, Serial No. 705,509. In Canada July 27, 1933

2 Claims. (Cl. 78—60)

The present application is a division of United States application 627,874 filed on August 8, 1932. In said prior application is described a locomotive superheater comprising tubular elements extending into the flues of a locomotive from the smoke-box end. Each of these elements comprises five tubes, four of which are grouped in a circle around the fifth. These tubes are joined to each other at the end remote from the smoke-box in such a manner that the four outer ones communicate with and can discharge into the central one. The dies described in said former application for the manufacture of this composite return end form the subject matter of the present application.

Figure 12:
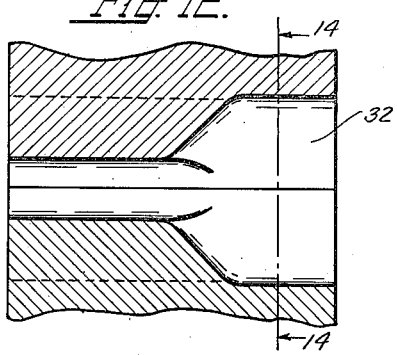
Figure 13:
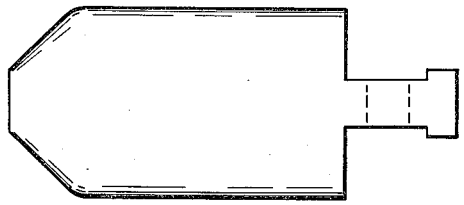

The invention is described in the following specification which makes reference to the drawings filed herewith. In these drawings Figs. 1 to 5 are views illustrating the dies for performing the first part of the operation to produce the composite return bend. Figs. 6 to 11 are views of the dies for performing the second step in such manufacture. Figs. 12 to 14 show the dies for a third step in such manufacture. Fig. 15 shows the appearance of the incomplete end after the third step has been performed on it. Figs. 16 and 17 show the appearance after subsequent steps and Figs. 18 and 19 show the dies for finally shaping the return bend.

The finished product of the operations performed by the dies is shown in Fig. 17. Four pipes 10—10 (only three showing) are connected by the return bend to the centrally located pipe 11. This structure is produced in several steps. The dies for performing the first of these steps are illustrated in Figs. 1 to 5. They comprise two portions—the split outer die 20—20 and the plunger or "pin" 21. These tools are used to connect the central pipe 11 to two diametrically opposite pipes 10—10. The two split halves 20—20 are each equipped with two semi-circular depressions 22—22 and a larger semi-circular depression 23 between them, the arrangement and sizes of these depressions or grooves being such that when the two halves are properly assembled, there are presented three cylindrical openings of such size as to accommodate the two pipes 10—10 and the return pipe 11. These circular openings are separated from each other by the walls 24—24, which extend inwardly from one end of the die but terminate at points 25—25 spaced from the opposite end of the dies. The absence of the walls 24—24 therefore leaves a continuous opening 26 from this opposite die end.

The pin or die 21 has a shape closely similar to that of the hollow interior of the die 20—20 except that it is smaller, so that when it is inserted in the die 20—20, it will be everywhere spaced from such die by a distance substantially equal to that of the wall thickness of the pipes. This die 21 therefore has a portion 26a, shown in cross section in Fig. 5, adapted to enter the space 26 and three fingers 22a—22a and 23a, spaced and sized to enter the three openings 22—22 and 23. Suitable mechanism is provided to cause the die 21 to perform a reciprocating stroke into the die 20—20.

The pipes, which it is desired to unite, are, after being clamped together and suitably heated, placed in the first half 22 of the female die and the other half is then brought into position and the die 21 caused to perform its stroke. This results in connecting the three pipes into a single open ended piece as will be at once understood by those familiar with this art. The pipes are during the stroke split along the sides facing each other and the portions adjacent to such slits are bent outward, those of one pipe abutting forcibly against those of the adjacent pipe and becoming welded to them. It is thought unnecessary to enter into any further explanation of this feature.

Figure 10:
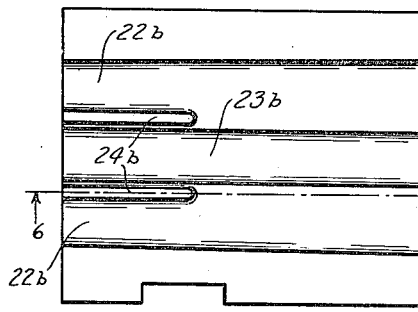
Figure 9:
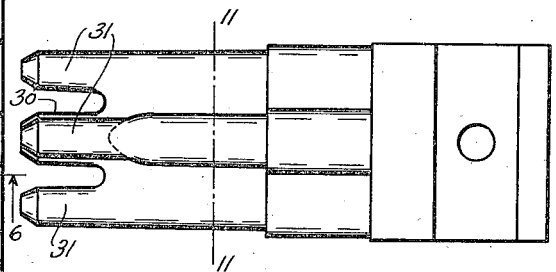
Figure 8:
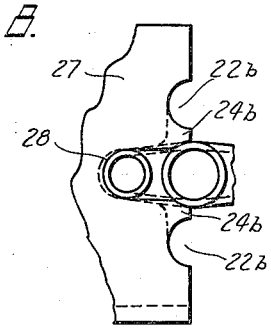
Figure 11:
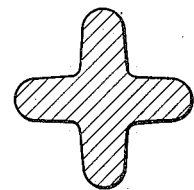

To connect the other two pipes 10—10, dies illustrated in Figs. 6 to 11 are used. These dies are in a general way similar to those just described and illustrated in Figs. 1 to 5 but differ from them in that the female portions have spaces to accommodate the pipes 10—10 which have been connected to the central pipe 11 during the first part of the process, and in the pin having five fingers. These spaces are illustrated at 28 in the half-die shown at 27. When the two halves 27—27 are assembled, the partially manufactured piece is located as indicated in Fig. 8. The two pipes 10—10 which are to be united to the partially manufactured piece occupy the spaces 22b—22b. These two depressions 22b—22b are closely similar to the depressions 22—22 of the first described dies. They are each semi-circular and when the die-halves are placed together, form circular cavities of the size to accommodate the pipes 10—10. They are separated from the central space 23b by the walls 24b—24b which terminate at the same distance inward from the end of the die as do the walls 24—24. The pin 29 in this case comprises five fingers or prongs. The central one of these appears at 30 and around it are grouped the four smaller ones 31—31.

A cross section on line 11—11 shows that the pin at this point has a cross shape. The female die has a closely complementary but somewhat larger interior.

In the use of this die the partly manufactured unit and the two pipes which are to be connected to it are, after being suitably clamped together and heated, placed in position and the two halves of the female die are closed. The pin then performs its reciprocating stroke, it being understood that suitable mechanism for this purpose is provided which may be the same as that used in the first part of the manufacture. This stroke results in connecting the second pair of the pipes 10—10 to the structure. The structure after this step has an open end in the shape of a cross. At the four extremities of the cross lie the four outer pipes 10—10 and at the center lies the pipe 11. It remains to close the open end to make the structure a complete functioning one. This closing is performed in two steps, the first of which consists in giving the cross-shaped end a round form and the second of which consists in swaging or drawing this rounded end down to a closure. A further step is subsequently performed to finally shape the return bend.

For the first rounding operation a pair of dies shown in Figs. 12 to 14 is employed. The die shown in Fig. 12 is made up of two halves. It has suitable recesses to take the pipes 10—10 and has an open circular end 32. The plunger shown in Fig. 13 is simply a blunt-nosed cylindrical piece of somewhat smaller size than the opening 32. The incomplete structure, having been suitably heated, is placed in the die of Fig. 12 and by suitable mechanism the plunger of Fig. 13 is caused to enter the die and to press the walls of the cross-shaped, incomplete structure outward against the walls of the die. The piece, after this operation has been performed, presents the appearance shown in Fig. 15, the end 33 being circular in cross section. An end view of the dies of Fig. 12 is shown in Fig. 14 and will make the construction of this die clear.

To close the circular open end 33 any suitable means may be employed, those which I prefer being a swaging machine of the type disclosed in U. S. Patent No. 1,339,054. It will be understood of course, that the piece is suitably heated before this swaging operation is performed. In Fig. 16 the piece is shown partially swaged down to a closure and in Fig. 17 it is shown completely closed. The swaging hammers are preferably of such shape that a small solid piece 34 results which is subsequently clipped off.

The structure is now closed and completely operative. It is desirable, however, when the structure is used in some relations, for example in a locomotive flue, to give it a shape offering less obstruction to the flow of the gases through the flue. If left as shown in Fig. 17 there is an unnecessarily large area on the inside of the return bend and an unnecessarily large obstruction to the gas flow on the outside is offered. It is therefore preferable to force back the walls from those parts where it was made circular in the operation with dies of Figs. 12 to 14 into a cross shape. This is preferably done by dies illustrated in Figs. 18 and 19. The four pieces 35—35 are, by suitable mechanism, moved into the positions shown in Fig. 18 to press the bulging parts of the structure back into a cross shape. The end from which the superfluous material 34 has been clipped is preferably also given a final finish by means of a suitable tool 36.

It will be clear that variations can be made in the superheater element described as well as in the tools and method of manufacture without departing from the spirit of the invention.

What we claim is:

1. In the art of joining pipes together, a set of dies comprising a female member and a male member, the female member comprising two identical halves, each half having two parallel spaced semi-cylindrical grooves and a third groove between and parallel to them, the third groove having a semi-cylindrical bottom and substantially parallel flat sides, the depth of the third groove being substantially equal to half the distance between the outer edges of the first two grooves, the middle groove being separated from the other two grooves by walls extending inwardly from one end of the half die to a point spaced from the other end, the two halves when placed in operative position presenting two cylindrical parallel bores and a flat transverse space between them and separated from them by walls extending inwardly from one end and terminating short of the other end, the male member being generally complementary to the assembled female member but smaller so that when inserted it is everywhere spaced from it by an amount substantially equal to the wall thickness of the pipes to be operated on.

2. A die according to claim 1, the semi-cylindrical grooves and semi-cylindrical bottom being to the same radius, the separating walls being relieved to accommodate a tube of larger radius.

CHARLES W. GORDON.
THOMAS F. BIRMINGHAM.